United States Patent
Shalati et al.

(10) Patent No.: US 8,519,026 B2
(45) Date of Patent: Aug. 27, 2013

(54) WATERBORNE POLYMERIC DISPERSIONS (75) Inventors: Mohamad Deeb Shalati, Louisville, KY (US); Richard Hendrikus Gerrit Brinkhuis, Zwolle (NL); Jeff A. Burger, Petal, MS (US); Ajaya Kumar Nanda, Louisville, KY (US)

(73) Assignee: Nuplex Resins B.V., Bergen Op Zoom (NL)

( * ) Notice: Subject to any disclaimer, the term of this patent is extended or adjusted under 35 U.S.C. 154(b) by 518 days.

(21) Appl. No.: 12/521,509

(22) PCT Filed: Dec. 21, 2007

(86) PCT No.: PCT/EP2007/064516
§ 371 (c)(1),
(2), (4) Date: Sep. 28, 2009

(87) PCT Pub. No.: WO2008/080906
PCT Pub. Date: Jul. 10, 2008

(65) Prior Publication Data
US 2010/0331453 A1 Dec. 30, 2010

Related U.S. Application Data (60) Provisional application No. 60/877,379, filed on Dec. 28, 2006.

(51) Int. Cl.
*C08L 63/00* (2006.01)
(52) U.S. Cl.
USPC ............ 523/400; 525/55; 524/543; 524/556; 524/548; 524/555; 524/547
(58) Field of Classification Search
None
See application file for complete search history.

(56) References Cited

U.S. PATENT DOCUMENTS

| | | | |
|---|---|---|---|
| 4,309,321 A | 1/1982 | Aihara et al. | |
| 4,333,865 A | 6/1982 | Zückert | |
| 4,996,250 A | 2/1991 | Awad et al. | |
| 5,231,131 A * | 7/1993 | Chu et al. | 524/504 |
| 5,502,113 A | 3/1996 | Antonelli et al. | |
| 5,530,070 A | 6/1996 | Antonelli et al. | |
| 5,698,625 A * | 12/1997 | Billiani et al. | 524/513 |
| 5,721,294 A | 2/1998 | Buter et al. | |
| 5,767,188 A | 6/1998 | Kamikuri et al. | |
| 5,770,648 A | 6/1998 | Antonelli et al. | |
| 6,166,150 A | 12/2000 | Wilke et al. | |
| 6,489,398 B1 | 12/2002 | Zückert et al. | |

(Continued)

FOREIGN PATENT DOCUMENTS
EP  25285 A1  3/1981
EP  60820 A1  9/1982

(Continued)

*Primary Examiner* — Randy Gulakowski
*Assistant Examiner* — Jeffrey Washville
(74) *Attorney, Agent, or Firm* — Coraline J. Haitjema; David P. Owen; Hoyng Monegier LLP (57) ABSTRACT

A polymeric composition for making aqueous polymeric dispersions, comprises hydrophilic macromonomer (I), hydrophobic polymer (II) and bridging monomer (III), wherein the hydrophilic macromonomer (I) and hydrophobic polymer (II) are grafted together in the presence of bridging monomer (III) and the hydrophilic macromonomer (I) has a structure according to formula (1): $R-C(X)=CH_2$, wherein R is a polymeric group and X is a radical stabilizing group. The aqueous polymeric composition is used for making a coating composition, a printing ink, an adhesive, a sealant or caulking material.

28 Claims, 1 Drawing Sheet

(56) References Cited

U.S. PATENT DOCUMENTS

| | | |
|---|---|---|
| 6,599,973 B1 * | 7/2003 | Visscher et al. ............... 524/504 |
| 6,645,476 B1 * | 11/2003 | Morschhauser et al. ...... 424/70.1 |
| 6,646,070 B2 | 11/2003 | Berge et al. |
| 6,660,793 B1 | 12/2003 | McIntyre et al. |
| 6,706,333 B2 | 3/2004 | Bremser et al. |
| 6,737,468 B1 | 5/2004 | Bremser |
| 6,872,789 B2 | 3/2005 | Brinkhuis et al. |
| 2002/0077411 A1 | 6/2002 | Nakajima et al. |
| 2002/0183473 A1 | 12/2002 | Matyjaszewski et al. |
| 2003/0125488 A1 | 7/2003 | Nakahara et al. |
| 2004/0054074 A1 | 3/2004 | Kuhneweg |
| 2004/0122173 A1 | 6/2004 | Kim |
| 2004/0171779 A1 | 9/2004 | Matyjaszewski et al. |
| 2005/0004317 A1 | 1/2005 | Auschra et al. |

FOREIGN PATENT DOCUMENTS

| | | |
|---|---|---|
| EP | 248574 A2 | 12/1987 |
| EP | 267562 A2 | 5/1988 |
| EP | 356920 A2 | 3/1990 |
| EP | 437743 A2 | 3/1990 |
| EP | 728780 A | 8/1996 |
| EP | 826751 A | 3/1998 |
| EP | 1069142 A | 1/2001 |
| EP | 1197536 A | 4/2002 |
| EP | 1197537 A2 | 4/2002 |
| EP | 1207173 A1 | 5/2002 |
| EP | 1295922 A2 | 3/2003 |
| EP | 2413330 A | 10/2005 |
| GB | 2413330 A * | 10/2005 |
| WO | 9527762 A1 | 10/1995 |
| WO | 9945078 A | 9/1999 |
| WO | 9945078 A1 | 9/1999 |
| WO | 9965958 A | 12/1999 |
| WO | WO 99/65958 * | 12/1999 |
| WO | WO 01/51534 A1 | 7/2001 |
| WO | WO0240560 A1 | 5/2002 |
| WO | WO2005012376 A1 | 2/2005 |
| WO | 2005056795 A2 | 6/2005 |
| WO | WO 2005/058882 A1 | 6/2005 |
| WO | 2006024669 A | 3/2006 |
| WO | WO 2006/024669 A1 * | 3/2006 |

* cited by examiner

WATERBORNE POLYMERIC DISPERSIONS

CROSS-REFERENCE TO RELATED APPLICATIONS

This application is a 35 U.S.C. §371 national phase application of International Application Number PCT/EP2007/064516, filed Dec. 21, 2007, which was published in English on Jul. 10, 2008 as WO 2008/080906, and claims priority to U.S. Provisional Patent Application Ser. No. 60/877,379, which was filed on Dec. 28, 2006, the entire contents of both of which are incorporated by reference herein.

This application is a 35 U.S.C. §371 national phase application of International Application Number PCT/EP2007/064516, filed Dec. 21, 2007, which was published in English on Jul. 10, 2008 as WO 2008/080906, and claims priority to U.S. Provisional Patent Application Ser. No. 60/877,379, which was filed on Dec. 28, 2006, the entire contents of both of which are incorporated by reference herein.

BACKGROUND OF THE INVENTION

1. Field of the Invention

The invention relates to a polymeric composition for making aqueous polymeric dispersions and, more particularly, to an aqueous polymer dispersion comprising such a polymeric composition; the use of a polymeric composition for making a coating composition, a printing ink, an adhesive, a sealant or caulking material; an aqueous coating composition; and a process for manufacture thereof.

2. Description of the Related Art

The use of polymer-based coatings to protect surfaces and enhance the aesthetic and functional properties of materials is well known.

Waterborne compositions are widely used to manufacture and apply such coatings because of their low VOC (Volatile Organic Compound) content as compared to solventborne compositions. However, some of the advantageous characteristics of the solventborne compositions have been difficult to attain with waterborne compositions. For example, high gloss durable finishes have proved elusive due to poor film coalescence, in particular in acrylic emulsions, and poor hydrolytic stability, in particular in water-reducible resins.

U.S. Pat. No. 5,698,625 discloses a process for the preparation of water-dilutable, air-drying coating binders based on acrylic modified and vinyl modified alkyd resin emulsions. The alkyd resin resulting from the disclosed process comprises hydrophilic groups grafted onto an alkyd by ester linkages. It is believed that the ester linkage at the boundary between the alkyd and the hydrophilic groups has a poor hydrolytic stability and that this leads to poor emulsion stability due to loss of the hydrophilic groups from the alkyd.

GB2413330 discloses an aqueous composition comprising at least one vinyl graft copolymer (A) and at least one vinyl polymer (B), where vinyl polymer (B) is more hydrophobic than vinyl graft copolymer (A). According to the examples vinyl graft copolymer (A) is obtained with a two step process. First a macromonomer is formed by reacting vinyl monomers in the presence of a cobalt catalyst and then free radical polymerizing this with vinyl monomers to provide a vinyl graft copolymer (A). Next vinyl copolymer (B) is formed in the presence of (A) by free radical polymerization of vinyl monomers. Polymer (B) is not grafted to copolymer (A) so that in the resulting mixture there is no hydrophilic polymeric chain grafted to a hydrophobic polymer.

WO 99/45078 discloses a water based dispersion useful for forming aqueous coating compositions. The problem addressed by WO99/45078 is the dispersion of hydrophobic materials such as melamine resins, hydrophobic polyesters, hydrophobic acrylic polymers, hydrophobic polyurethanes and blocked organic polyisocyanates in aqueous solution. The proposed solution to the problem is the use of a dispersant in the form of a branched polymer comprising a hydrophilic backbone and side chain hydrophilic macromonomer branches appended thereto. The dispersion is formed by mixing together the dispersant and the hydrophobic material by agitation before dispersion of the two components in water. In the resulting dispersion there is no grafting between the dispersant branched polymer and the hydrophobic material which is to be dispersed. This leads to a lack of stability of the aqueous dispersion and poor water resistance of the dried film.

Resydrol AY 586 is an example of a commercially available aqueous alkyd dispersion representing the state of the art. In comparison to this state of the art dispersion, the dispersion of the present invention exhibits improved stability, exemplified by a minimal pH drift and change in viscosity after 28 days under hot room conditions (120 F). For a more detailed description see example 16 of the present application.

BRIEF SUMMARY OF THE INVENTION

At least some of the deficiencies of the prior art waterborne compositions are overcome by the present invention which discloses a polymeric composition for making aqueous polymeric dispersions, said polymeric composition comprising hydrophilic macromonomer (I), hydrophobic polymer (II) and bridging monomer (III), wherein the hydrophilic macromonomer (I) and the hydrophobic polymer (II) are grafted to one another in the presence of bridging monomer (III), or a mixture of bridging monomers (III), and the hydrophilic macromonomer (I) has a structure according to formula (1) R—C(X)=CH2, wherein R is a polymeric group and X is a radical stabilizing group. Polymeric group means a group containing a chain of four or more carbon atoms The term grafted, as used herein, refers to linking via chemical bonding; that is when grafting has taken place an unbroken chain of chemical bonds link together the hydrophilic macromonomer (I) and hydrophobic polymer (II).

Figure 1:
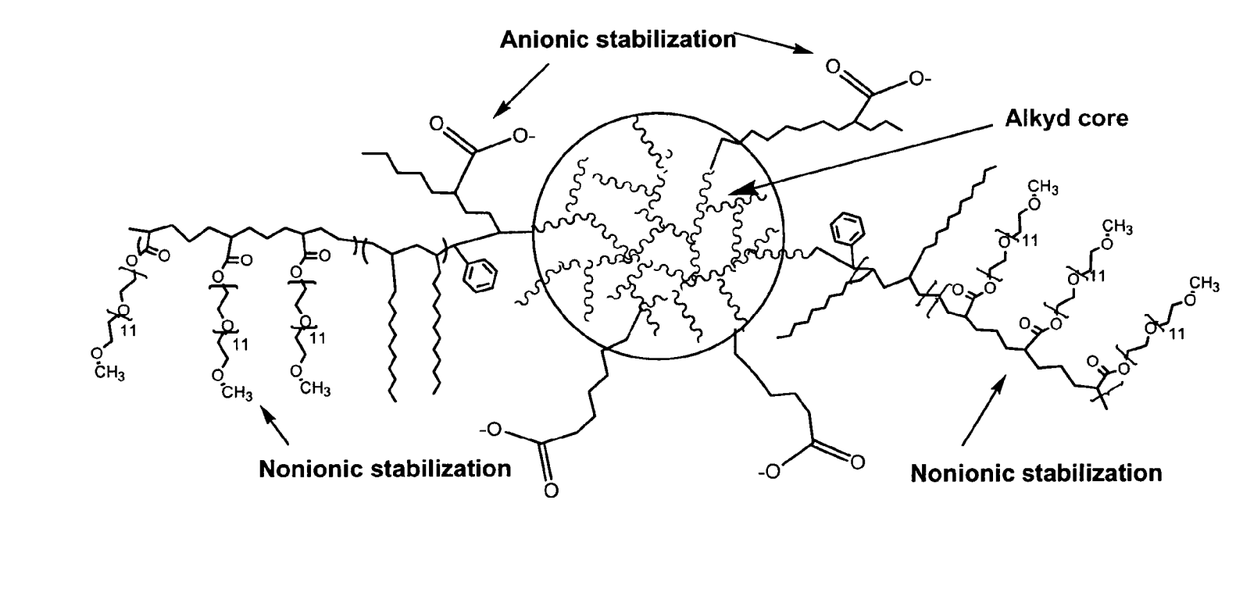
FIG. 1 shows a non-limiting example of a polymeric composition in accordance with the invention.

FIG. 1 shows a non-limiting example of a polymeric composition in accordance with the invention.

The hydrophobic polymer (II) represents the bulk of the polymeric composition and of the material in the envisaged application, for example the hydrophobic polymer (II) may be a binder material in a coating. In accordance with the invention the hydrophilic macromonomer (I) is co-reacted with the hydrophobic polymer (II) in the presence of bridging monomer (III) using the ethylenically unsaturated bond on the hydrophilic macromonomer (I). It is believed that this results in a graft copolymer having a length of polymerized bridging monomer forming between the hydrophilic macromonomer (I) and the hydrophobic polymer (II). Such length of polymerized bridging monomer is believed to be relatively short; however, the invention is not limited to a short chain length.

The grafting of the hydrophilic macromonomer (I) and the hydrophobic polymer (II) results in a polymeric composition which has a good dispersibility in water. As a result the composition can be dispersed in water to produce a secondary polymeric emulsion which has an improved stability in relation to prior art secondary polymeric emulsions.

Hydrophilic Macromonomer (I)

The term hydrophilic refers to a net affinity to water. In particular, in terms of the hydrophilic macromonomer (I), it indicates that the hydrophilic macromonomer (I) has an affinity for water such that the effect of the presence of the hydrophilic macromonomer (I) in the polymeric composition is to make the polymeric composition dispersible in water. Preferably the hydrophilic macromonomer (I) has a solubility in water of at least 3 wt. %, more preferably at least 10 wt. %, more preferably at least 50 wt. % and most preferably at least 90 wt. % at room temperature.

The hydrophilicity of the hydrophilic macromonomer (I) is generated by the presence of nonionic or ionic hydrophilic groups or a mixture of nonionic and ionic hydrophilic groups in the hydrophilic macromonomer (I).

In low VOC content applications, nonionic groups may be preferred because they offer a reduced viscosity compared to ionic hydrophilic groups.

Of the hydrophilic ionic groups, anionic groups are preferred. Preferably carboxylic acid, sulphonic acid or phosphoric acid are used as the anionic groups. Alternatives to the anionic groups include cationic tertiary amine groups.

Where the hydrophilic macromonomer (I) comprises nonionic hydrophilic groups, the hydrophilic effect is obtained via a polar interaction between one or more nonionic groups on the hydrophilic macromonomer (I) and water. Preferred nonionic groups are polyoxyalkylene (meth)acrylates. In a preferred embodiment a majority of the nonionic hydrophilic groups of the hydrophilic macromonomer (I) are polyoxyalkylene(meth)acrylate groups. Even more preferably at least 90 wt. % of the nonionic hydrophilic monomers of the hydrophilic macronomer (I) are polyoxyalkylene(meth)acrylate groups.

A hydrophilic macromonomer (I) in accordance with the invention preferably has a number average molecular weight ranging between 100 and 20000. More preferably the molecular weight is between, 200 and 20000, 400 and 20000 or 500 and 15000. Most preferably the molecular weight is between 1000 and 10000.

For nonionic hydrophilic macromonomers (I) the number average molecular weight of the macromonomer (I) is preferably less than 20000 and more preferably between 500 and 5000.

For ionic hydrophilic macromonomers the number average molecular weight is preferably greater than 200 and more preferably greater than 300 but preferably no greater than 20000 and most preferably no greater than 10000.

The hydrophilic macromonomer (I) may also contain lipophilic groups as well as the required hydrophilic groups. In this manner the hydrophilic macromonomer (I) may be an amphiphilic block-copolymer macromonomer. When the hydrophilic macromonomer is amphiphilic, it is preferably embodied as a block macromonomer comprising a hydrophilic block (H-block) and a lipophilic block (L-block). The term lipophilic as used herein refers to a component of the amphiphilic macromonomer which has a greater affinity to lipids than the hydrophilic components of the macromonomer.

The lipophilic block (L) is preferably located between the hydrophilic block (H) and the ethylenically unsaturated bond to provide a macromonomer of the formula HL=CH2. Since grafting together of the hydrophilic macromonomer (I) and the hydrophobic polymer (II) is effected through use of the ethylenically unsaturated bond, this preferred embodiment results in a composition in which the hydrophilic part of the amphiphilic macromonomer is furthest away from the hydrophobic polymer (II). This is believed to advantageously result in an increased dispersion stability of the composition and an increased hydrolytic stability; that is, a decrease in hydrolysis of susceptible groups on the hydrophobic polymer when dispersed in water.

As previously discussed the hydrophilic macromonomer (I) is provided with a radical stabilizing group X in accordance with formula (1) R—C(X)=CH2. The radical stabilizing group is preferably selected to be a phenyl, ester, amide, acid or nitrile group.

In accordance with a preferred embodiment of the invention the hydrophilic macromonomer (I) has a structure according to formula (2): R'—C(Z)(Y)—CH2-C(X)=CH2, wherein R' is a polymeric group, at least one of Y or X is a radical stabilizing group, and Z is H, C1 to C4 alkyl or a cyano group, and wherein one or more of X, Y and Z may be in a ring structure. Preferably, both X and Y are radical stabilizing groups.

The radical stabilizing groups X, Y are preferably phenyl, ester, amide, acid or cyano groups.

The hydrophilic macromonomer (I) can be obtained by atom transfer radical polymerization (ATRP) followed by dehydrohalogenation; by degenerative iodine transfer polymerization (DITP) followed by dehydrohalogenation; by high temperature abstraction (back-biting) fragmentation polymerization (HTFP), preferably at least at 150° C., more preferably at least at 180° C. and most preferably at least at 200° C.; by addition fragmentation polymerization (AFP); or by cobalt mediated catalytic chain transfer polymerization.

WO2006/024669 A1, which is hereby incorporated in its entirety by reference, describes AFP reactions suitable for preparation of the above described hydrophilic macromonomers (I).

In accordance with a preferred embodiment of the invention, X is phenyl and the macromonomer (I) is obtained by an addition fragmentation polymerization reaction (AFP) using alpha-methylstyrene dimer (AMSD). This advantageously results in short chain hydrophilic macromonomers (I) with a low molecular weight, a low polydispersity and a high macromonomer purity (defined as the mol % of the macromonomer chains with double bond end groups). Preferably the macromonomer purity is at least 50, more preferably at least 80%, even more preferably over 90% and is most preferably as high as possible. High hydrophilic macromonomer (I) purity results in more effective grafting and improved emulsion stability.

Preferably the AMSD route is carried out in combination with methacrylic type monomers. In this process AMSD is used as a reversible addition-fragmentation chain transfer agent. This effectively allows the insertion of methacrylic monomers, such as methoxy polyethyleneglycol methacrylate and/or methacrylic acid, between the original AMS units of the AMSD, while preserving the terminal unsaturated unit, and hence the hydrophilic macromonomer (I) reactivity. This insertion process can be extended also with new methacrylic monomers, to form a block copolymeric macromonomer structure while maintaining the reactive terminal unsaturated bond.

The reactivity of the macromonomer is lower than the methacrylate monomer. Therefore, an optimum process for the manufacture of a block copolymeric structure includes pre-addition of the AMSD or macromonomer which is then preferably extended by slow addition of the monomer-initiator mixture. Best results are obtained when the effective steady state concentration of monomer (relative to macromonomer) can be kept as low as possible.

A specific synthesis of a hydrophilic macromonomer (I), described as a non-limiting example for the purposes of illustration, is as follows; a four-neck round-bottom reaction flask is equipped with a condenser, agitator, heating mantle and thermocouple attached to a temperature controller. Ten percent of a first (or only) monomer mix is added to the flask with AMSD and solvent. The initial charge is heated under an inert nitrogen blanket to reflux at about 127° C. depending upon the solvent. The temperature is increased to 132 to 135° C. throughout the monomer addition. The monomers are added over six hours with a graduated addition funnel or metering pump depending on the reactor size. The initiator is tert-butyl peroxy-3,5,5-trimethylhexanoate in an amount of 4 mole % of the monomers and AMSD. If the desired polymer is to be an amphiphilic macromonomer containing a lipophilic stage and a hydrophilic stage, the first of these stages is added in 4 hours followed by the addition of the second stage in 2 hours. The reaction mixture is then held for 1 hour at 132° C. to allow for completion of the polymerization reaction.

Hydrophobic Polymer (II)

The hydrophobic polymer (II) can be any hydrophobic polymer that comprises a graftable moiety, such as a copolymerizable moiety. Suitable examples include anhydride-functional polymers, fluoro or halo-functional polymers, hydrocarbon polymers or any solvent-borne functional or non-functional polymer used in the preparation of coatings, adhesives, sealants, or mixtures thereof. Preferably, it is an alkyd, a polyester, a polyamide, an acrylic, a melamine, a polyurethane, a polyepoxide, a polyisocyanate or a polysiloxane, or hybrids or mixtures thereof, that comprise a graftable moiety. Hydrophobic polymers (II) which are hydrolysable, for example alkyds and polyesters, benefit particularly from the present invention because protection from hydrolysis of the polymer is provided in the polymeric composition.

The term hydrophobic indicates a net repulsion to water. In this sense the hydrophobic polymer (II) has a net repulsion to water, that is, the hydrophobic polymer (II) is not soluble or dispersible in water and typically has a solubility of less than 10 wt % in water at room temperature.

Use of an alkyd as the hydrophobic polymer (II) results in a composition usable to produce a coating composition having a relatively low price; good coating properties; a long shelf life; good dispersion stability; and good weather resistance.

Alkyds are polyesters containing unsaturated fatty acids. Their definition and methods of production are well known in the art.

The hydrophilic macromonomer (I) and hydrophobic polymer (II) are preferably grafted together by radical polymerization. Therefore the hydrophobic polymer (II) is preferably provided with reactive groups susceptible for radical polymerization reactions, for example unsaturated groups or graftable chain transfer moieties. Preferred unsaturated copolymerizable groups include maleate, fumarate, acryloyl, methacryloyl, vinyl or allyl groups. Preferred chain transfer active moieties include thiols, aldehydes, activated methylene, phenyls, carbonyls or ether groups.

The hydrophobic polymer (II) may be obtained by non-radical polymerization of a monomer mixture comprising monomers having ethylenically unsaturated groups.

A specific synthesis of an alkyd hydrophobic polymer, described as a non-limiting example for the purposes of illustration, comprises the steps of heating alkyd monomers in the presence of 0.045% Fascat 4350 (available from Arkema Inc.) (on alkyd charge) and 1% methylisobutylketone (MIBK), based on solid yield, under a nitrogen sparge, until the reaction distils water. The temperature of the reaction is then increased until a target acid value is reached of typically less than 20, preferably less than 10, (mg KOH/gr of the hydrophobic polymer) at which time additional MIBK is added to maintain a steady reflux and decrease the acid value. As much of the azeotropic MIBK as possible is removed.

Alternatively, the hydrophobic polymer (II) may be obtained by radical polymerization optionally followed by post-modification with a reactant comprising ethylenically unsaturated monomers wherein the reactant is linked to the hydrophobic polymer (II) with an ester, urethane, urea, ether, amide or imide bond. The reactant comprising ethylenically unsaturated monomers is preferably a maleate, fumarate, (meth-)acryloyl, tetrahydrophthalic acid, allyl, unsaturated fatty acids groups or a rosin. For example a radically polymerized polyol can be post-modified by reaction with an unsaturated fatty acid. Another example of post-modification is to radically polymerize a monomer mixture comprising polymerizable monomers and GMA (glycidylmethacrylic acid) followed by post modification of the epoxy group of the GMA with a reactant comprising an unsaturated group, for example acrylic acid.

The hydrophobic polymer (II) is typically the majority component of the polymeric composition of the invention, preferably being present at between 40 and 98 wt. % of the polymeric composition. Therefore it is preferred that it is this component which forms a network on curing of the coating composition and that it therefore preferably comprises crosslinkable functional groups. Preferred groups are selected from hydroxyl, carboxyl or olefinically unsaturated groups.

Alternatively, the hydrophilic macromonomer (I) and/or the bridging monomer (III) may comprise crosslinkable functional groups instead of or as well as the hydrophobic polymer (II). Preferably the crosslinking groups for these components are selected from acetoacetate (to introduce carbonyl functionality such as diacetone acrylamide); allyl to introduce unsaturated bonds in the case of oxidative drying; or hydroxyl containing monomers for crosslinking with polyisocyanates, anhydrides, polyamines or melamines.

In any of the above embodiments the hydrophobic polymer (II) preferably has a number average molecular weight ranging between 500 and 25000. More preferably the molecular weight of the hydrophobic polymer (II) is between 1000 and 50000 and most preferably it is between 2000 and 20000.

Preferably the hydrophobic polymer (II) has an acid value of less than 20, preferably less than 10 and even more preferably less than 3 (mg KOH/gr of (II)). A low acid value indicates low levels of hydrolysis and water sensitivity of the polymeric composition.

Bridging Monomer (III)

The bridging monomer (III) can be any monomer capable of reacting both with the hydrophilic macromonomer (I) and the hydrophobic monomer (II) such that the hydrophilic macromonomer (I) and hydrophobic polymer (II) are grafted to one another via the bridging monomer (III). The term grafting as used herein refers to linking via chemical bonding and may for example be effected through free-radical copolymerization of the components.

It is believed that reacting the hydrophilic macromonomer (I) and hydrophobic polymer (II) in the presence of bridging monomer (III) provides for an efficient grafting of the hydrophilic macromonomer (I) onto the hydrophobic polymer (II), improving the stability of the dispersion and improving the hydrolytic stability of the hydrophobic polymer (II).

An example of suitable bridging monomers (III) are (meth-)acrylic monomers. When (meth-)acrylic monomers are utilized, it is preferred that the bridging monomers comprise a significant amount of acrylic monomers, preferably at least 25%, and/or at most 75% methacrylic monomers. This advantageously results in better grafting between the hydrophilic macromonomer (I) and the hydrophobic polymer (II). Without restriction of this application to any particular theory, it is believed that acrylic monomers promote copolymerization of the hydrophilic macromonomer (I) in a chain (whereas methacrylic monomers would prefer insertion behind the double bond of the radical) leaving the radical on the hydrophilic macromonomer (I) with a relatively low reactivity for reaction with the unsaturation of the hydrophobic polymer (II). Preferred (meth)acrylic monomers include MPEG-substituted (meth)acrylates.

Another example of suitable monomers include styrenic monomers, for example styrene, vinyltoluene and alpha-methylstyrene.

Particularly suitable examples of monomers include, but are not limited to, styrene, vinyl toluene, alph-methylstyrene, vinyl acetate, vinyl esters, vinyl chloride, halogen-substituted ethylene or alkylene, methacrylonitrile, acrylonitrile, methyl (meth-)acrylate, ethyl(meth-)acrylate, propyl(meth-)acrylate, isomers of propyl(meth-)acrylate, butyl(meth-)acrylate, isomers of butyl(meth-)acrylate, hexyl(meth-)acrylate, 2-ethylbutyl(meth-)acrylate, crotyl(meth-)acrylate, 2-ethylhexyl (meth-)acrylate, isobornyl(meth-)acrylate, isoamyl(meth-)acrylate, benzyl(meth-)acrylate, phenyl(meth-)acrylate, tetrahydrofurfuryl(meth-)acrylate, 3,3,5-trimethylcyclohexyl(meth-)acrylate, alpha-methylstyrene, cyclohexyl (meth-)acrylate, stearyl(meth-)acrylate, lauryl(meth-)acrylate, isodecyl(meth-)acrylate. The scope of the invention is not limited to monomers without crosslinkable groups therefore, crosslinkable monomers suitable for use in the present invention include, but are not limited to, glycidyl(meth-)acrylate, 2-hydroxyethyl(meth-)acrylate, hydroxypropyl(meth-)acrylate, isomers of hydroxypropyl(meth-)acrylate, 4-hydroxybutyl(meth-)acrylate, isomers of hydroxybutyl(meth-)acrylate, glycerolmono(meth-)acrylate, (meth-)acrylic acid, itaconic anhydride, citraconic anhydride, dimethylaminoethyl(meth-)acrylate, diethylaminoethyl(meth-)acrylate, dimethylaminopropyl methacrylamide, 2-tert-butyl aminoethyl (meth-)acrylate, triethyleneglycol(meth-)acrylate, methacrylamide, N,N-dimethyl methacrylamide, N-tert-butyl methacrylamide, N-methylol methacrylamide, N-ethylol methacrylamide, alpha-methylvinyl benzoic acid (all isomers), diethylamino alpha-methylstyrene, 2-isocyanatoethyl (meth-)acrylate, isomers of diethylamino alpha-methylstyrene, trimethoxysilylpropyl(meth-)acrylate, triethoxysilylpropyl(meth-)acrylate, (meth-)acrylic acid, tributoxysilyl propyl(meth-)acrylate, dimethoxymethylsilyl propyl(meth-)acrylate, diisopropoxymethylsilylpropyl (meth-)acrylate, dimethoxysilylpropyl(meth-)acrylate, diethoxysilylpropyl(meth-)acrylate, dibutoxysilylpropyl (meth-)acrylate, diisopropoxysilyol propyl(meth-)acrylate, isobutylene, and mixtures thereof.

Polymeric Composition

Examples of polymeric compositions according to the invention comprise 1 to 30 wt. % hydrophilic macromonomer (I), 40 to 98 wt. % hydrophobic polymer (II) and 2 to 60 wt. % bridging monomer (III), wherein the total of hydrophilic macromonomer (I), hydrophobic polymer (II) and bridging monomer or monomers (III) is 100 wt. %.

Preferably the polymeric composition comprises 1 to 20 wt. %, more preferably 1 to 15 wt. % and most preferably 1 to 10 wt. % of the hydrophilic macromonomer (I), 40 to 98, more preferably 50 to 95 wt. % and most preferably 55 to 90 wt. % of the hydrophobic polymer (II) and 2 to 60 wt. %, more preferably 5 to 50 wt. % and most preferably 7 to 40 wt. % of the bridging monomer (III), wherein the total of hydrophilic macromonomer (I), hydrophobic polymer (II) and bridging monomer or mixture of bridging monomers (III) is 100 wt. %.

According to a preferred embodiment of the invention the polymeric composition is obtainable by a process wherein the hydrophobic polymer (II) comprises an ethylenically unsaturated group; the bridging monomers (III) are ethylenically unsaturated monomers; and the components (I), (II) and (III) are co-reacted in the presence of a radical initiator. Any conventional free radical initiator may be utilized in the present invention. Examples of suitable radical initiators include organic peroxides, ether or acyl hydroperoxides, di-ether or diacyl peroxides, peroxydicarbonates, mixed ether acyl peroxides, mixed ether peroxy carbonates, and mixed acyl peroxy carbonates.

The hydrophobic polymer (II) may comprise graftable chain transfer active moieties instead of or as well as the above-mentioned unsaturated group.

The acid value of the polymeric composition in any of the above embodiments is preferably less than 40 mg KOH/gr of the polymeric composition; and more preferably less than 35, 30, 25; and most preferably less than 16. A low acid value is preferred to reduce hydrolysis and water sensitivity of the polymeric composition.

The invention also relates to a process for the preparation of the polymeric composition comprising the steps, in no particular order, of adding together and reacting
1) hydrophilic macromonomer (I) having a structure according to formula (1): R—C(X)=CH2, wherein R is a polymeric group and X is a radical stabilizing group;
2) hydrophobic polymer (II);
3) bridging monomer (III); and
4) free radical initiator.

According to a preferred embodiment, preparation of the polymeric composition comprises the steps of
i) adding the hydrophilic macromonomer (I) to the hydrophobic polymer (II), preferably under agitation and heating;
ii) adding the bridging monomer (III) and a free radical initiator;
iii) optionally adding a solvent, preferably less than 30 wt. %, more preferably less than 20 wt. %, even more preferably less than 10 wt. %, before during or after step i) or ii).

The invention further relates to an aqueous polymer dispersion comprising the polymeric composition described above, dispersed in water and optionally further comprising a neutralizing agent, solvent, crosslinking agents and/or additives, and a preferred process for the manufacture thereof comprising the steps of:
i) adding the hydrophilic macromonomer (I) to the hydrophobic polymer (II), preferably under agitation and heating;
ii) adding the bridging monomer (III) and a free radical initiator;
iii) optionally adding a solvent, preferably less than 30 wt. %, more preferably less than 20 wt. %, even more preferably less than 10 wt. %, before during or after step i) or ii);
iv) neutralizing the obtained polymer composition;
v) adding water to the polymeric composition and mixing to obtain a secondary emulsion. Preferably the quantity of water added results in an emulsion of between 20 and 65 wt. %, more preferably between 30 and 50 wt. %, and most preferably between 35 and 45 wt. %.

In one embodiment the solvent referred to in step iii) may remain in the aqueous polymer dispersion, in this case the solvent is preferably water miscible and can, for example, be ethylene glycol butyl ether. Alternatively, the solvent may be removed so that it is not present in the produced aqueous polymer dispersion, in this case the solvent is preferably acetone or methylethyl ketone.

Preferably step i) is carried out between 110° C. and 200° C. and in step (ii) the bridging monomer (III) and initiator are gradually added, preferably over a 2 to 6 hour period. The initiators are preferably tert-butyl peroxybenzoate and or di-tert-butyl peroxide.

According to an alternative preferred embodiment there is provided an in-situ copolymerization process comprising the steps of:
 i) producing a hydrophobic polymer (II), preferably a high acid value hydrophobic polymer (II), in a vessel, preferably by condensation reaction;
 ii) adding a hydrophilic macromonomer (I), having a structure according to formula (1): R—C(X)=CH2, wherein R is a polymeric group and X is a radical stabilizing group, to the vessel
 iii) adding bridging monomer (III) and a free-radical initiator to the vessel;
 iv) copolymerising the above components;
 v) preferably heating the vessel content to a higher temperature to complete the condensation reaction;
 vi) neutralizing the resultant product; and
 vii) dispersing the product in water.

According to another alternative preferred embodiment of the invention the hydrophobic polymer II is only fully formed after the grafting reaction. For example, the process comprises grafting of the macromonomer I to a precursor polymer that is not hydrophobic, in the presence of bridging monomers III. Subsequently the grafted prepolymer is modified to form it into the hydrophobic polymer II. Preferably, the precursor polymer is a polymer, preferably an alkyd, comprising carboxylic acid groups, for example having an acid value between 50 and 150, which is after the grafting reaction modified to a hydrophobic polymer III by reaction with another polymer, preferably an alkyd, comprising hydroxyl groups, for example having a hydroxyl value between 10 and 80.

Suitable neutralizing agents for use in the above processes include but are not limited to; tertiary amine compounds such as, trialkyl amine, monohydroxyalkyl, dialkyl amine, dihydroxyalkyl, monoalkyl amine, trihydroxyalkylamine. Specific examples include tri-ethyl amine; tri-propyl amine; tri-butyl amine; dimethyl, ethanol amine; methyl, diethanol amine, triethanol amine. Preferred neutralizing agents are selected to be non-volatile-organic-compounds, for example ammonium hydroxide.

An advantage of the polymeric composition according to the present invention can be found in reduced water sensitivity and better dispersion stability compared to the prior art. This results from grafting together of the hydrophilic macromonomer (I) and the hydrophobic polymer (II) in the presence of the bridging monomers (III). As a result a reduced level of surfactants is needed to obtain stable dispersions. Minor amounts of surfactants may be added for example as leveling agents but preferably the aqueous polymer dispersion comprises less than 3 wt % surfactant. Most preferably, however, the aqueous polymer dispersion comprises no surfactant.

The term surfactant means a surface-active agent other than the hydrophilic macromonomer (I), hydrophobic polymer (II) or bridging monomer or monomers (III). In particular an agent used for improving emulsion stability, also referred to as an emulsifier.

The polymer composition in accordance with the invention, or an aqueous polymer dispersion comprising such a composition is preferably used to manufacture a coating composition, particularly an aqueous coating composition; a printing ink; adhesive; sealant; or a caulking material.

The manufacture of the aqueous polymer dispersion preferably employs an amount of solvent below 20 wt % and results in a coating having a VOC content, without prior distillation or stripping, of less than 225 g/l.

The crosslinking reaction or the cure of the final aqueous dispersions after application can be through auto-oxidation, self crosslinking or through crosslinking with a crosslinking agent. Apart from curing the film can also harden by drying only. Where in this specification the term curing is used it also implies drying.

Coating compositions containing the polymeric composition show improved shelf stability compared to water-based compositions using prior art polymer dispersions. The coatings produced from such compositions exhibit better initial color (less yellow), better impact resistance, better gloss retention upon exposure, better resistance to yellowing in darkness and better hydrolytic stability.

A specific method for preparing a secondary emulsion where the polymer is an alkyd and the macromonomer is an AMSD block copolymer, described as a non-limiting example for the purposes of illustration, is set out below.

The alkyd is heated to 149° C. and the AMSD block copolymer macromonomer, and optionally solvent, is added to the alkyd under agitation. A mixture of bridging monomers, and organic peroxides is added over 3-4 hours via a metering pump. Typical amounts of initiator are 3-4% tert-butyl peroxybenzoate based on monomers and the AMSD copolymer. The reaction mixture is held for 1 hour at 149° C. and then a small amount of an additional initiator in the form of 1% di-tert-butyl peroxide is added as a chaser. The reaction is held for another hour to complete the polymerization process. To produce the emulsion the product is held at 88° C., neutralized with ammonia hydroxide and mixed for 10 minutes. To the neutralized product, deionized water is added over 40 to 90 minutes while maintaining the temperature at 80° C. The total amount of water reduces the copolymer to a 45% solids emulsion. After the water is added, the mixture is mixed for 15 minutes and then cooled to 66° C. and held for 30-60 minutes. The emulsion is then cooled to room temperature, filtered and collected.

Some embodiments of the invention may result in polymer dispersions having average particle size dispersions of greater than 1000 nm, Dispersions having such average particle sizes are generally not stable whereas dispersions having average particle sizes of less than 1000 nm give better stability, good film-formation and good coating properties. In order to convert such large particle dispersions to small particle dispersions, they may be subjected to homogenization using a high pressure/high shear homogenizer, for example APV 2000, made by APV-Americas™, or microfluidizer such as model-110Y made by Microfluidic™. In both machines, an intense energy (shear) is applied to the product stream causing the coarse droplets to break into a finer size.

BRIEF DESCRIPTION OF THE DRAWINGS

The features and advantages of the invention will be appreciated upon reference to the following drawings, in which.

DESCRIPTION OF ILLUSTRATIVE EMBODIMENTS

EXAMPLES

A number of non-limiting examples are set out below.

Example 1

Examples 1-A, 1-B, 1-C and 1-D illustrate, by way of non-limiting example, methods of making the hydrophobic polymers (II); the hydrophilic macromonomer (I); the polymeric composition comprising hydrophobic polymer (II), hydrophilic macromonomer (I) and bridging monomer (III); and the emulsions of the resulting polymeric composition of this invention.

Example 1-A

Preparation of a Hydrophobic Alkyd Polymer (II)

A four-necked reaction flask equipped with a condenser; agitator; heating mantle; addition funnel; thermocouple attached to a control box (Love control series 32A); and primed Dean-Stark trap with methyl isobutyl ketone, was charged with 28.5 parts (by weight) of Pamolyn-200 (unsaturated fatty acid available from Hercules Pinova Products, having 77% linoleic acid and 22% oleic acid content), 28.5 parts of tall oil fatty acid, 22.4 parts of trimethylol propane, 20.2 parts of isophthalic acid, 0.4 parts maleic anhydride, 0.05 parts of Fascat 4350 (Butyl tin catalyst available from Arkema Inc.) and 2 parts methyl isobutyl ketone, and heated under 0.5 SCFH (standard cubic feet per hour) (0.014 m3hr-1) nitrogen flow to 165° C. At 165° C., water started to distil azeotropically. The reaction temperature was increased to 230° C. and maintained at such temperature until an acid value of less than 8 was attained. The Dean-Stark trap was drained and the nitrogen flow was increased to 2 SCFH (0.057 m3hr-1) to remove as much of the azeotropic methyl isobutyl ketone as possible. The alkyd was cooled to 150° C. and filtered.

At this point, the resin can be used for further modification (Example 1-C below) or it can be reduced with water-miscible co-solvent such as glycol ethers to the desired percentage content of non-volatile material (NVM).

The obtained alkyd had an acid value of 7.9; a hydroxyl value of 33; a number average molecular weight (Mn) of 1990; a weight average molecular weight (Mw) of 6700; and a polydispersity of 3.4.

Example 1-B

Preparation of a Hydrophilic Macromonomer (I) (HL-block Type) Using AMSD (Alpha-methylstyrene Dimer)

A four-neck reaction flask equipped as in Example 1-A, was charged with 0.5 parts of methyl methacrylate, 6 parts of MPEG-550 (methoxy polyethyleneglycol methacrylate having Mn of 550), 5 parts of alpha-methylstyrene dimer and 13 parts of propylene glycol methyl ether and heated under a 0.2 SCFH (0.006 m3 hr-1) flow of nitrogen to 127° C. A monomer mixture of 4.5 parts of methyl methacrylate, 54 parts of MPEG-550, 2.8 parts of t-butyl peroctoate was then added over 4 hours via addition funnel. The temperature was increased to 132-135° C. throughout the monomer addition. A second monomer mixture composed of 5 parts methyl methacrylate, 25 parts lauryl methacrylate, 1.2 parts tert-butyl peroctoate and 3 parts glycol ether was added over 2 hours maintaining the temperature at 132-135° C. range. Heating was continued for an additional 1 hour at 132° C. The hydrophilic macromonomer thus obtained was cooled and filtered.

The resulting resin had 81.3% non-volatile material (NVM); a viscosity of 435 m Pa·s; a Mn of 2440; a Mw of 5550; and a polydispersity of 2.25.

Example 1-C

Preparation of Graft Acrylic-Alkyd Copolymer

To a four-neck reaction flask equipped as in Example 1-A, 80 parts of the hydrophobic alkyd polymer of Example 1-A was added and heated to 150° C. The hydrophilic macromonomer of example 1-B (9.2 parts) was then added. A mixture of 4.35 parts styrene, 3.75 parts butyl acrylate, 1.9 parts of methyl methacrylate, 2.5 parts of methacrylic acid, 0.8 part of tert-butyl perbenzoate, and 0.2 part of di-tert-butyl peroxide was added over a 3 hr period while maintaining the temperature at 150° C. The reaction contents were held at 150° C. for an additional 1 hour. Another 0.2 parts of di-tert-butyl peroxide was added while holding the reaction at 150° C. for an additional 1 hr. The contents were then cooled to 135° C. and 23.3 parts of propylene glycol butyl ether added.

The resulting graft copolymer had 79.8% NVM; a viscosity of 2700 m Pa·s; an acid value of 18.3; a color of 4; a Mn of 3350; a Mw of 21,275; and a polydispersity of 6.35.

Example 1-D

Preparation of a Waterborne Acrylic-Alkyd Dispersion

A four-neck reaction flask equipped with a condenser; agitator; heating mantle; addition funnel; and thermocouple attached to a control box; was charged with 56 parts of the graft acrylic-alkyd copolymer of Example 1-C. The graft acrylic-alkyd polymer was then heated to 80° C. Slow addition (10 minutes) of 0.83 parts (90% neutralization) of ammonium hydroxide with good mixing followed. De-ionized water (43 parts) was then added gradually over 30-40 minutes with vigorous mixing and agitation while maintaining the temperature between 60-80° C. Additional mixing was maintained for 15 more minutes. The resulting white milky aqueous dispersion had 44.3% NVM; a viscosity of 2.4 Pascal seconds; a particle size of 364 nm; and a pH of 8.5. The emulsion was stable in viscosity and pH at ambient and elevated temperature (120° F. (48.9° C.)) conditions for five weeks.

Examples 2 to 7

Examples 2 to 7 illustrate a number of hydrophobic polymers (in form of alkyds and polyesters); hydrophilic macromonomers; and emulsions. Tables 1, 2 and 3 show the constituents used in the preparation of the hydrophobic polymers, the hydrophilic macromonomers, graft copolymers, and aqueous emulsions.

Examples 2-A to 7-A

Preparation of Hydrophobic Polymers (II)

Table 1 sets out the type and quantity in parts of the raw materials used in the preparation of long, medium and short-oil alkyds and polyester polyols suitable for use as the hydrophobic polymer (II). The preparation of these hydrophobic polymers is similar to that described for Example 1-A and will be clear to those skilled in the art on the basis of Example 1-A. For lower acid value alkyds or polyester, glycidil versatate (Cardura E-10 from Hexion Specialty Chemicals) is used to consume the residual carboxylic acid groups as shown in Examples 3-A and 5-A.

TABLE 1

| Raw Materials | Example No. | | | | | |
| --- | --- | --- | --- | --- | --- | --- |
| | 2-A Long-Oil Alkyd | 3-A Chain-Stopped Alkyd | 4-A Long-Oil Alkyd | 5-A Short-Oil Alkyd | 6-A Chain Stopped Alkyd | 7-A Polyester Polyols |
| Soya oil FA | | 30.5 | | 26.4 | 34.9 | |
| Tall Oil FA | 26 | | 55 | | | |
| Linseed Oil FA | 26 | | | | | |
| Benzoic Acid | | 18.2 | | 9.2 | 12.8 | |
| Trimethylolpropane | 25 | | | 19.5 | | 8.1 |
| Pentaerythritol | | 23.2 | 16 | 9.2 | 23.5 | |
| Glycerol | | | 5.4 | | | |
| Neopentyl Glycol | | | | | | 38.2 |
| Isophthalic Acid | 22.6 | | | | | 32.2 |
| Phthalic Anhydride | | 25.2 | 22.6 | 31.8 | 28.3 | 12.9 |
| Adipic acid | | | | | | 5.9 |
| Maleic Anhydride | 0.4 | | 0.5 | 0.1 | 0.5 | 2.6 |
| Cardura E-10 P | | 2.9 | | 3.9 | | |
| Ethylene glycol butyl ether | | | | | | 11 |

Examples 2-B to 6-B

Preparation of Hydrophilic Macromonomers (I)

Table 2 sets out the type and quantity in parts of the raw materials used in the preparation of hydrophilic macromonomers (I). The preparation of the hydrophilic macromonomers resulting from table 2 is similar to that described for Example 1-B, except for Example 5-B. Example 5-B was prepared in three consecutive steps as follows.

The first step involved a high temperature and pressure acrylic polymerization to prepare a first hydrophilic block, H1. In a 5 liter pressure reactor 25 parts of butyl acetate was charged. The reactor content was pressurized with nitrogen to 75 psi (517 kPa) and heated to 195° C. A monomer mixture composed of 35.5 parts of hydroxyethyl acrylate, 34 parts of hydroxyethyl methacrylate and 30.5 parts of methyl methacrylate was added over 2.5 hours while maintaining the temperature at 195° C. and the pressure at 75 psi (517 kPa). The reaction was then held at 195° C. for an additional 1 hour. The temperature was then reduced to 140° C. and the pressure to 24 psi (165 kPa). A mixture of 0.3 parts of t-butyl perbenzoate, 0.01 part di-t-butyl peroxide and 3 parts of butyl acetate was added over 1 hour. After holding for additional hour, the reaction product was stripped from volatiles to provide hydroxy-functional macromonomer (H1) at 97.7% solids.

The second and third phases of the preparation involved the insertion of the second hydrophilic block (H2) and then the lipophilic block to obtain an ABC triblock or H1H2L-type hydrophilic macromonomer, 5-B. To a reactor similar to that described for Example 1-B, 33.25 parts of the above hydroxy-functional macromonomer (H1) was added and heated to 140° C. A mixture of 32.5 parts of MPEG-550 methacrylate, 5 parts of methyl methacrylate and 0.28 parts of t-butyl-peroxy-3,5,5-trimethylhexanoate was added over 3 hours. After holding for an additional 30 minutes, a second monomer mixture composed of 25 parts of lauryl methacrylate, 5 parts of methyl methacrylate and 0.22 parts of t-butyl-peroxy-3,5,5-trimethylhexanoate was added over 3 hours at 140° C. After holding at 140° C. for 30 minutes, 10 parts of ethylene glycol butyl ether was added and heating was continued for an additional 30 minutes. The resultant H1H2L macromonomer had % solids of 90.9; an acid value of 2; Mw of various steps of 2600, 4171, and 14,200 for the H1, H1-H2 and H1-H2-L respectively.

TABLE 2

| Raw Materials | Example No. | | | | |
| --- | --- | --- | --- | --- | --- |
| | 2-B Hydrophilic Macromonomer HL-type* | 3-B Hydrophilic Macromonomer HL-type | 4-B Hydrophilic Macromonomer H-type** | 5-B Hydrophilic Macromonomer H1H2L-type*** | 6-B Hydrophilic Macromonomer HL-type |
| Propylene Glycol Methyl Ether | 16 | 16 | 16 | | |
| Propylene Glycol Butyl Ether | | | | | 37 |
| Ethylene Glycol Butyl Ether | | | | 9 | |
| Methyl Methacrylate | | 15 | 35 | 19.9 | |
| Methacrylic Acid | | | | | 21.4 |
| Methoxypolyethyleneglycolmethacrylate MPEG 550 | 57 | 60 | 60 | 32.5 | |
| alpha-Methylstyrene Dimer | 5 | 5 | 5 | | 5.4 |
| t-Butyl peroxy-3,5,5-trimethylhexanoate | 4 | 4 | 4 | 4.7 | |
| Lauryl Methacrylate | 38 | 20 | | 25 | 37 |

TABLE 2-continued

| Raw Materials | 2-B Hydrophilic Macro-monomer HL-type* | 3-B Hydrophilic Macro-monomer HL-type | 4-B Hydrophilic Macro-monomer H-type** | 5-B Hydrophilic Macro-monomer H1H2L-type*** | 6-B Hydrophilic Macro-monomer HL-type |
|---|---|---|---|---|---|
| Hydroxyethyl Methacrylate | | | | 11.0 | 6.3 |
| Butyl Methacrylate | | | | | 30 |
| Hydroxyethylacrylate | | | | 11.5 | |

*HL-type = Hydrophilic/Lipophilic,
**H-type = Hydrophilic,
***H1H2L-type = Hydrophilic1-Hydrophilic2/Lipophilic The hydrophilic macromonomers (examples 2-B to 6-B) set out in table 2 were produced as HL-type block amphiphilic macromonomers; that is, they have the general structure HL=CH$_2$ whereby the hydrophilic stage is separated from the unsaturated bond by the lipophilic stage. Example 5-B is provided with two different hydrophilic stages H1 and H2.

Examples 2-C to 6-C

Preparation of Grafted Copolymers

Table 3 sets out the type and quantity in parts of raw materials used in preparing examples of grafted copolymers comprising the hydrophilic macromonomers (I) of examples 2-B to 4-B grafted onto the hydrophobic polymer (II) of Example 2-A; and of the hydrophilic macromonomer (I) of example 1B grafted onto the hydrophobic polymers (II) of 6-A and 4-A.

Examples 2-D to 6-D

Preparation of Secondary Alkyd Emulsions

Table 4 provides the characteristics of the secondary alkyd emulsions prepared by dispersion of the resins 2-C, 3-C, 5-C and 6-C. The experimental procedures used to disperse the samples were similar to those described for Example 1-C, except for example 6-D. For 6-D, the neutralized acrylic alkyd copolymer, 6-C, was placed in a water-jacketed vessel attached to a high-speed disperser. Water was added gradually over 1 hour while mixing at 2000-6000 rpm. The temperature of the mixture was maintained above 60° C. No inversion was observed at 45% solids above 60° C. The white milky mixture was allowed to invert while cooling to room temperature over night, to obtain an aqueous dispersion of 6-D which required additional processing (see Example 15).

Dispersion of the acrylic-alkyd copolymer 4-C gave a high viscosity emulsion with large particle size. To achieve a smaller particle size and lower viscosity high pressure/high shear homogenization can be used. Alternatively a more easily dispersed acrylic-alkyd copolymer comprising hydrophobic polymer 2-A and hydrophilic macromonomer 4-B, can be achieved by using the in-situ copolymerization process described generally above in the section entitled polymeric composition and more specifically at example 14 below.

TABLE 3

| Raw Materials | 2-C Acrylic-Alkyd Graft Copolymer | 3-C Acrylic-Alkyd Graft Copolymer | 4-C Acrylic-Alkyd Graft Copolymer | 5-C Acrylic-Alkyd Graft Copolymer | 6-C Acrylic-Alkyd Graft Copolymer |
|---|---|---|---|---|---|
| Hydrophobic Polymer | (2-A) 77.3% @ 99.3% NVM | (2-A) 78.2% @ 99.3% NVM | (2-A) 77.3% @ 99.3% NVM | (6-A) 81% @ 98.8% NVM | (4-A) 81% @ 98.6% NVM |
| Hydrophilic Macromonomer | Example #2-B 12% @ 79% NVM | Example #3-B 6.1% @ 80.5% NVM | Example #4-B 12% @ 83.8% NVM | Example #1-B at higher solids* 7.9% @ 95.25% NVM | Example #1-B higher solids* 8.35% @ 95.25% NVM |
| Styrene | 3.4 | 5.1 | 3.4 | 3.1 | 3.1 |
| Methyl Methacrylate | 1.35 | 2.3 | 1.35 | 3.5 | 3.5 |
| Methacrylic Acid | 2.0 | 2.8 | 2.0 | 4.0 | 4.0 |
| Butyl Acrylate | 2.9 | 4.4 | 2.9 | 1.9 | 1.9 |
| t-Butyl Perbenzoate | 0.6 | 0.6 | 0.6 | 0.6 | 0.6 |
| Di-t-butyl peroxide | 0.4 | 0.4 | 0.4 | 0.4 | 0.4 |

*Example #1-B is made at higher solids (95.25%)

TABLE 4

Alkyd Emulsions of Examples 2-D to 6-D

| | Example No. | | | |
|---|---|---|---|---|
| | 2-D | 3-D | 5-D | 6-D |
| Acrylic Alkyd copolymer | 2-C | 3-C | 5-C | 6-C |
| Acid Value | 15 | 19 | 32 | 30 |
| % Solids | 45.5 | 44.85 | 45.6 | 44.5 |
| Particle Size (nm) | 200 | 217 | 826 | 1630 |
| Viscosity m. Pascal S. | 244 | 536 | 11460 | 9818 |

Examples 7

Preparation of Waterborne Alkyd Dispersion Using LH-Type Hydrophilic Macromonomer This example is identical to that of Example 1 except that the ordering of the hydrophilic (H) block and the lipophilic block (L) in relation to the ethylenically unsaturated bond has been reversed in the hydrophilic macromonomer to give the structure LH=CH2.

Example 7-B

Preparation of LH-Type Hydrophilic Macromonomer

To a four-neck reaction flask equipped with a condenser; agitator; heating mantle; addition funnel; and thermocouple attached to a control box, 0.5 parts of methyl methacrylate, 2.5 parts of lauryl methacrylate (the lipophilic component), 5 parts of alpha-methylstyrene dimer and 13 parts of propylene glycol methyl ether were added and the content heated under a nitrogen flow to 127° C. A monomer mixture of 4.5 parts of methyl methacrylate, 22.5 parts of lauryl methacrylate (the lipophilic component, L), 1.4 parts of t-butyl peroxy-3,5,5-trimethylhexanoate was then added over 2 hours via an addition funnel. The temperature was increased to 132-135° C. throughout the monomer addition. A second monomer mixture composed of 5 parts methyl methacrylate, 60 parts of MPEG-550 (the hydrophilic component, H), 2.6 parts of t-butyl peroxy-3,5,5-trimethylhexanoate and 0.75 parts propylene glycol monomethyl ether was added over 4 hours maintaining the temperature in the range of 132-135° C. Heating was continued for an additional 1 hour at 132° C. The hydrophilic macromonomer of the LH-type thus obtained was cooled and filtered.

The resulting resin had 84.8% NVM; a viscosity of 500 m Pa·s; and an acid value of 0.7.

Examples 7-C & D

Preparation of Graft Acrylic-Alkyd Copolymer

The preparation of the aqueous alkyd dispersion using the LH-type hydrophilic macromonomer of 7A was identical to the preparation of the procedure in Examples 1-C and 1-D. The following component quantities were used, 80 parts alkyd of Example 1-A; 8.8 parts of macromonomer of Example 7-B; 4.4 parts of styrene; 3.75 parts of butyl acrylate; 1.7 parts of methyl methacrylate; 2.2 parts of methacrylic acid; 0.7 parts of t-butyl perbenzoate; 0.4 parts of di-t-butyl peroxide; and 11 parts of ethylene glycol butyl ether.

The obtained copolymer alkyd had % solids of 87.5; a viscosity of 9850-14800 m Pa·s; and an acid value of 20. Upon dispersing 114 parts of the graft acrylic alkyd copolymer, with 0.9 parts of dimethylethanol amine and 86 parts of water, an aqueous secondary alkyd emulsion was obtained. This emulsion was stable and had a pH of 8.9, a viscosity of 8.25 Pascal seconds, % solids of 49.5, and particle size of 158 nm.

Examples 8 & 9

Effect of Presence of Bridging Monomers

Example 8 is a comparative example wherein it is attempted to produce an aqueous dispersion using the hydrophobic polymer of example 1-A and the hydrophilic macromonomer of example 1-B, in the absence of bridging monomers. The aqueous dispersion of example 8 was not stable, its viscosity was very high, and the particle size was immeasurable.

Example 9 in comparison to example 8 was provided with the bridging monomers of Example 1-C at 25%. Example 9 had an acid value of 27, showed formation of small particles and had a good stability.

Details of examples 8 and 9 are given in table 5.

TABLE 5

| | Example No. | |
|---|---|---|
| | Example 8 | Example 9 |
| Hydrophobic Polymer (II) from Example 1-A | 91.4% | 67.5% |
| Hydrophlic Macromonomer (I) from Example 1-B | 8.6% | 7.5% |
| Bridging Monomers (III) as used in Example 1-C | 0% | 25% |
| t-Butyl Perbenzoate | | 1.25 |
| Di-t-butyl peroxide | | 0.6 |
| t-Butyl peroxy-3,5,5-trimethylhexanoate | 3.4 | |
| Acid Value | 5.0 | 27.8 |
| % Solids of Dispersion | 40% | 40% |
| Viscosity (Pascal second) | 29 | 0.9 |
| Particle Size (nm) | Not Measurable | 114 |

Example 10

Comparative Example

This example is a repetition of example 1 differing in that the hydrophobic polymer (II), hydrophilic macromonomer (I) and bridging monomers (III) are only physically mixed so that no chemical reaction or covalent bonding between the components occurs.

Examples 10-C

Acrylic Copolymer

The composition of the bridging monomers of Example 1-C was copolymerized separately. Thus 57 parts of ethylene glycol butyl ether were added to a polymerization vessel (similar vessel to the of Example 1) and heated to 132° C. A mixture of 35 parts styrene, 30 parts butyl acrylate, 15 parts of methyl methacrylate, 20 parts of methacrylic acid, 4 part of t-butyl peroxy-3,5,5-trimethylhexanoate and 1.7 parts of ethylene glycol butyl ether were added over a 4 hour period while maintaining the temperature at 132° C. Additionally, 1.7 parts of ethylene glycol butyl ether were added. The reaction contents were held at 132° C. for 1 hour. Another 0.5 parts of t-butyl peroxy-3,5,5-trimethylhexanoate were added while holding the reaction at 132° C. for an additional 1 hr. The reaction was then cooled to 135° C. and 1.7 parts of ethylene glycol butyl ether was added.

The obtained acrylic solution had 64.7% solids content, a viscosity of 27 m Pa·s, and an acid value of 113.

Examples 10

Physical Blend of Hydrophobic Polymer (II), Hydrophilic Macromonomer (I) and Polymerised Bridging Monomers (III)

To a round bottom flask, 80 parts of the hydrophobic alkyd polymer of Example 1-A (99.8% solids), 19.3 parts of the acrylic polymer of Example 10-C (64.7% solids) and 9.2 parts of the hydrophilic macromonomer of Example 1-B (81.3% solids) and 9.2 parts of ethylene glycol butyl ether were added. The physical blend was heated to 60° C. and 2.7 parts of dimethyl ethanol amine (80% neutralization) was added during agitation. To this mixture, 127 parts of water were added. The dispersion process was completed as described in Example 1-D. The resultant aqueous milky dispersion was not stable and flocculated immediately after cooling to ambient conditions.

Examples 11

Comparative Example

This example was a repeat of Example 1, except that the hydrophilic macromonomer (I) and the bridging monomers (III) were first copolymerized and then added to the hydrophobic polymer (II) to form a physical mixture without any chemical reaction or covalent bonds between the hydrophobic polymer and the previously copolymerized hydrophilic polymer and bridging monomers.

Examples 11BC

Copolymerization of Hydrophilic Macromonomer and Bridging Monomers

To a reaction vessel (similar to that described in Example 1), 26.7 parts of ethylene glycol butyl ether and 46.1 parts of the hydrophilic macromonomer of Example 1-B (81.3% solids) were added. The reaction content was heated to 132° C. and a mixture of 21.9 parts of styrene, 18.75 parts of butyl acrylate, 9.4 parts of methyl methacrylate, 12.5 parts of methacrylic acid, and 1.5 parts of t-butyl peroxy-3,5,5-trimethylhexanoate was added over a 4 hour period while maintaining the temperature at 132° C. The reaction contents were held at 132° C. for 1 additional hour. Another 0.2 parts of t-butyl peroxy-3,5,5-trimethylhexanoate and 0.3 parts of ethylene glycol butyl ether were added while holding the reaction at 132° C. The resultant acrylic copolymer had 62% solids; a viscosity of 21 m Pa·s, and an acid value of 77.

Examples 11

Physical Blend of Hydrophobic Polymer and the Previously Copolymerized Hydrophilic Macromonomer and Bridging Monomers To a round bottom flask, 80 parts of the hydrophobic alkyd polymer of Example 1-A (99.8% solids), 32 parts of the copolymer prepared in Example 11-BC (62% solids) and 2.7 parts of ethylene glycol butyl ether were added. The physical blend was heated to 60° C. and 2.9 parts of dimethyl ethanol amine (85% neutralization) were added during agitation. To this mixture, 129 parts of water were added and the dispersion process was completed as described in Example 1-D. The resultant aqueous milky dispersion was not stable and flocculated immediately after cooling to room temperature.

Examples 12

This example relates to secondary polymer emulsions based on polyester polyol.

Example 12-A

Preparation of Polyester Polyol

In a reactor similar to that described in Example 1-A, the raw materials listed in Table 6 were charged and heated to 225° C. Xylene was used to remove water azeotropically and the reaction was stopped after attaining an acid value of 6. Ethylene glycol butyl ether was added to provide a polyester polyol solution having 93.7% solids; a viscosity of 6340 m Pa·s; and an acid value of 4.4.

TABLE 6

| Hydrophobic Polyester Polyol of Example 12-A | |
|---|---|
| Raw Material | Amount |
| NPG-90 | 37.8 |
| Trimethylol Propane | 8.1 |
| Adipic Acid | 8.4 |
| Isophthalic Acid | 32 |
| Phthalic Anhydride | 12.8 |
| Maleic Anhydride | 0.85 |
| Facat 4102 | 0.04 |
| Toluene | 4 |
| Ethylene Glycol Butyl ether | 6.6 |

Examples 12-C/D

Preparation of Acrylic Polyester Polyol Copolymer & Aqueous Dispersion

In a reactor similar to that described in Example 1-C, the appropriate amount (Table 7) of polyester polyol of Example 12-A (Table 7) was charged along with the hydrophilic macromonomer (Table 7) of Example 1-B at 95.25% solids. The reaction mixture was heated to 120° C. The acrylic monomers of Table 7 were then added over 1 hour. The reaction was continued as described in Example 1-C. After cooling to 60° C. and neutralization with di-methyl ethanol amine (DMEA), the reaction mixture was transferred to a high speed disperser vessel and water was added slowly with vigorous agitation over 1 hour. The resultant milky white dispersion had 40% solids; a pH of 8.6; particle size of 210 nm; and reduced viscosity of 68 Pascal S. at 30% solids.

TABLE 7

Acrylic Polyester Polyol Graft Copolymer of Example 12-C/D

| Raw Material | Amount |
| --- | --- |
| Example 12-A @ 93.5% solids | 84.5 |
| Example 1-B @ 95.25% solids | 7.8 |
| Methyl Methacrylate | 3.5 |
| Styrene | 3.12 |
| Butyl Acrylate | 1.9 |
| Methacrylic Acid | 4 |
| t-Butyl Peroctoate | 0.6 |
| Dimethyl Ethanol Amine | 4.45 |
| De-ionized Water | 140 |

Example 13

Comparative Example

This is a comparative example prepared according to the procedures of US patent (Billiani et al. U.S. Pat. No. 5,698, 625, 1997) and the specific composition of Resydrol AY 586 based on Australian Notification (NICNAS—PLC/400, 2004).

Thus from the free-radical polymerization of the raw materials of Table 8 at 138° C. with monomer addition time of 6 hours, an acrylic-fatty acid copolymer was obtained at 95.35% solids.

TABLE 8

Ingredients for the Fatty Acid-Acrylic copolymer of Example 13

| Raw Material | Amount |
| --- | --- |
| Linseed Fatty Acid | 33% |
| Isobutyl Methacrylate | 27.1 |
| Linseed Fatty Acid | 8.4 |
| Methacrylic Acid | 20.6 |
| Vinyl Toluene | 6 |
| Pentapropylene glycol mono-methacrylate | 4.9 |
| t-Butyl Perbenzoate (initiator) | 7.5 |
| t-Butyl Peroctoate (chaser) | 0.5 |

An alkyd modified with the above fatty-acid acrylic copolymer using the raw materials of Table 9 was obtained. Upon neutralization and dispersion, a viscous alkyd dispersion was obtained having 38.1% solids; an acid value of 53 mg KOH/g; a viscosity of 14.4 Pascal S.; a particle size of 168 nm; a pH of 8.45; and a density of 1.01 g/cc.

TABLE 9

Alkyd dispersion Ingredients of Comparative Example 13

| Raw Material | Amount |
| --- | --- |
| Linseed Fatty Acid | 28.5% |
| Pentaerythritol | 13.6 |
| Pamolyn 347 | 8.3 |
| Isophthalic acid | 12.4 |
| Water Loss to AV = 30 | (4.4) |
| Fatty-acid acrylic copolymer of Table 8 @ 95.7% solids | 42 |
| Water Removal | (0.3) |
| Xylene Removal | (2) |
| 25% Ammonium Hydroxide | 5 |
| De-mineralized Water | 150 |

Examples 14

In-situ Copolymerization Process

This example illustrates an additional aspect of the present invention wherein a modified process for making the polymer dispersion is used. In a reaction vessel similar to that described for Example 1-A, the components A of Table 10 are charged and heated to 200° C. under nitrogen. The reaction is held for one hour, then components B of Table 10 are added. Heating is continued at 230° C. until an acid value of 30 is attained while water is collected (using methyl propyl ketone as the azeotropic solvent). After cooling to 165° C., components C are added over 1 hour, followed by the addition of D and holding of the reaction for an additional one hour at 165° C. The reaction temperature is then increased to 190-195° C. until an acid value of 30 is attained. The reaction product is cooled, neutralized with triethyl amine and dispersed in water as described in Example 6-D to 40% solids. The resultant alkyd dispersion has 40% solids; and a particle size of 108 nm at a pH of 9.1.

TABLE 10

Alkyd dispersion made by the In-situ Process of Example 14

| Segment | Raw Material | Amount |
| --- | --- | --- |
| A | Tall Oil Fatty Acid | 49.6 |
|  | Pentaerythritol | 9.9 |
|  | Glycerine | 2.6 |
|  | Triphenyl phosphite |  |
| B | Glycerine |  |
|  | Hexahydrophthalic anhydride | 12.4 |
|  | Maleic Anhydride |  |
|  | Water Loss to AV = 30 | (4.4) |
| C | Hydrophilic Macromonomer Example 1-B | 7.5 |
|  | Methyl methacrylate | 3.5 |
|  | Styrene | 3.1 |
|  | Butyl Acrylate | 1.9 |
|  | Methacrylic Acid | 4 |
|  | Di-t-butyl peroxide | 0.6 |
| D | Di-t-butyl peroxide | 0.05 |
|  | Water Loss to AV = 30 | (0.6) |
|  | Triethyl Amine | 5.9 |

Examples 15

Homogenization of Example 6-D

This example demonstrates the use of high shear equipment for the production of stable aqueous secondary polymer emulsion according to the present invention. Secondary alkyd emulsions having an average particle size of larger than 1000 nm are not stable and require additional processing to that described in Examples 1-D or 6-D. Average particle size dispersions less than 1000 nm are needed for better stability, good film-formation and good coating properties. Thus, the secondary alkyd emulsion of Example 6-D is subjected to homogenization using a high pressure/high shear homogenizer (APV 2000, made by APV-Americas). The processing parameters used and resultant stability data are shown in Table 11. The data of Table 11 clearly demonstrate a dramatic particle size reduction after the first pass through the homogenizer. Also, particle size, viscosity and pH remained relatively constant throughout the study.

TABLE 11

Homogenization and Stability of Secondary Alkyd Emulsions

Processing via Homogenization

| | Temperature (in) °C. | Temperature (out) °C. | Particle Size (nm) | Viscosity m Pascal S. |
|---|---|---|---|---|
| Initial | 25 | NA | 1636 | 9818 |
| First Pass | 25 | 60 | 400 | NA |
| Second Pass | 50 | 63 | 340 | 490 |

Stability of the Homogenized Alkyd Emulsions

| | Time Days | pH | Particle Size (nm) | Viscosity m Pascal S. |
|---|---|---|---|---|
| Room Tempt. | 4 | 8 | 350 | 490 |
| Oven (120° F. (48.9° C.)) | 4 | 8 | 340 | 350 |
| Room Tempt. | 19 | 8 | 330 | 470 |
| Oven 120° F. (48.9° C.)) | 19 | 7.8 | 414 | 200 |
| Room Tempt. | 34 | 8 | 320 | 430 |
| Oven 120° F. (48.9° C.)) | 34 | 7.6 | 760 | 132 |

Examples 16

Stability and Coatings Properties of Resins and Coatings

In Example 16A, the stability of an alkyd dispersion of the present invention (Example 1D) is compared to a commercially available example of alkyd dispersion (Resydrol AY 586 available from Cytec Industries Inc.; similar to the comparative Example 13). In Example 16B, the shelf stability and film properties of coatings made from the present invention (Example 1D), and Resydrol AY 586 are compared.

Examples 16-A

Stability of Alkyd Emulsions

TABLE 12

Stability of Alkyd Emulsions of Examples 1D & Resydrol AY 586 at 120° F. (48.9° C.))

| Sample | Aging Time (day) | pH | Particle Size (nm) | Viscosity Pascal S. |
|---|---|---|---|---|
| Example 1 @ 45% solids | Initial (0) | 8 | 185 | 2.4 |
| | 14 | 8 | 201 | 1.8 |
| | 21 | 8 | — | 1.7 |
| | 28 | 8 | 240 | 1.5 |
| % Change | | 0% | 30% | 37.5% |
| Comparative Resydrol AY 586 | Initial (0) | 7.5 | 91 | 43.5 |
| | 14 | 6.7 | 107 | 180 |
| | 21 | 6.7 | — | 361 |
| | 28 | 6.6 | 112 | 250 |
| % Change | | 12% | 23% | 475% |

The results (Table 12) of hot room stability of the alkyd emulsion of Example 1 versus that of Resydrol AY 586 show that the present invention has a minimal drift in pH and viscosity upon storage in hot room storage.

Examples 16-B

Shelf Stability of Paint Made from Example 1D

Two white paints were prepared, the first using the alkyd emulsion of Example 1D and the second using an alkyd dispersion of Resydrol AY 586. The particular paint formulas are set out in Table 13. Comparative properties of these paints are set out in Table 14. The data indicates the higher performance of paint made according to the present invention. Higher gloss retention, less yellowing, and higher reverse impact are obtained for the paint of Example 16-B.

TABLE 13

White Paint Formula of Example 16-B

| Materials | Description | Function | Supplier | Pounds (kg) | Gallons (litres) |
|---|---|---|---|---|---|
| In a High Speed Dispersion Vessel, Add | | | | | |
| Dowanol PnP | Propylene glycol monopropyl ether | Co-Solvent | Dow Chemical | 12.0 (5.4) | 1.63 (6.17) |
| De-ionized Water | Treated Water | Dilution and Viscosity Adjustment | | 56.0 (25.4) | 6.72 (25.44) |
| Disperbyk-182 | A block copolymer with pigment affinic groups | Pigment Dispersant | Byk Chemie | 18.0 (8.2) | 2.10 (7.95) |
| DrewPlus L-405 | A hydrophobic silica dispersed in silicones | Defoamer | Air Products and chemicals Inc. | 0.3 (0.1) | 0.04 (0.15) |
| | | Sift in under agitation | | | |
| R-706 | Surface-treated TiO2 | White Pigment | DuPont | 280.0 (127.0) | 8.40 (31.80) |
| High Speed Disperse for 30 minutes and then add under moderate agitation | | | | | |
| Example 1-D | Alkyd Dispersion | Pigment Binder | | 600.0 (272.2) | 71.09 (269.10) |
| Triethyl amine | Tertiary Organic Amine | Neutralization & pH Adjustment | Air Products and chemicals Inc. | 2.0 (0.9) | 0.33 (1.25) |
| Premix, then add Under Agitation | | | | | |
| Dowanol PnP | Propylene glycol monopropyl ether | Co-Solvent | Dow Chemical | 25.0 (11.3) | 3.40 (12.87) |

TABLE 13-continued

White Paint Formula of Example 16-B

| | | | | | |
|---|---|---|---|---|---|
| 5% Cobalt Hydrocure | Water reducible metal carboxylate | Oxidation Catalyst or Drier | OM Group, Inc. | 7.5 (3.4) | 0.97 (3.67) |
| DRI-Rx | 2,2'-Bipyridyl | Drier Synergist | OM Group, Inc. | 1.0 (0.5) | 0.12 (0.45) |
| Exkin #2 | Methylethyl ketoxime | Anti-Skinning Agent | Condea Servo B.V. | 2.5 (1.1) | 0.33 (1.25) |
| Surfynol 104 DPM | 2,4,7,9-tetramethyl-5-decyn-4,7-diol | Improve flow, leveling and substrate wetting | Air Products and chemicals Inc. | 3.75 (1.70) | 0.40 (1.51) |
| Raybo 60 | | Anti-Flash Rusting Additive | Raybo Chemical Company | 3.75 (1.70) | 0.49 (1.85) |
| Byk 024 | | Defoamer | Byk Chemie | 2.50 (1.13) | 0.30 (1.14) |
| If needed, Adjust pH to 8.3-8.8 with | | | | | |
| Triethyl amine | Tertiary Organic Amine | Neutralization & pH Adjustment | Air Products and chemicals Inc. | | |
| Adjust viscosity to 80-85 KU with | | | | | |
| De-ionized Water | Treated Water | Dilution and Viscosity Adjustment | | 30.70 (13.93) | 3.68 (13.93) |
| TOTALS | | | | 1045.00 (474.00) | 100.00 (378.54 |

| Formulation Constants of Paint of Table 13 | Test Method | Typical Value |
|---|---|---|
| pH | ASTM E 10 | 8.7 |
| Viscosity, Krebs Units (KU) | ASTM D 5626 | 85 |
| Viscosity, ICI (Poise) | ASTM D 4287 | 0.6 |
| Leneta Sag Resistance (mils) | ASTM D 4400 | 8 |
| Solids % by weight | Calculated | 54.3 |
| Solids % by volume | Calculated | 41.1 |
| Pigment to Binder Ratio | Calculated | 1.0/1 |
| Pigment Volume Concentration (%) | Calculated | 20.5 |
| Gloss 20°/60° (after 7 days at 77° F., 1.25 mil Dry Film Thickness) | D 523 | 82/90 |
| Volatile Organic Compounds (grams/liter) | Calculated | 240 |

TABLE 14

Coatings Properties of White Paint of Example 16-B

| | Test Method | Example 1 | Resydrol AY 586 |
|---|---|---|---|
| Drying Properties, 3 mil wet draw down | | | |
| Set-to-touch (hr.min) | ASTM D 5895 | 4.0 | 1.5 |
| Tack-free | ASTM D 5895 | 5.5 | 4.5 |
| Dry-hard | ASTM D 5895 | 6.5 | 8.0 |
| Dry-through | ASTM D 5895 | 10.5 | 9.0 |
| Thumb Twist 24 hrs | ASTM D 1640 | OK | OK |
| Surface tack after 24 hrs | Finger pressure | OK | OK |
| Dry Film Properties* after 7 days@ 77° F. | | | |
| Gloss 20°/60° | ASTM D 523 | 81/91 | 84/93 |
| "b" value**, CIElab system | ASTM E 1347 | 4.3 | 6.5 |
| Impact, reverse (in.-lb.) | ASTM D 2794 | 160 | <10 |
| Hardness, Konig (sec.) | ASTM D 4366 | 15 | 25 |
| Condensing Humidity, 140 F. (6 hrs.) Gloss 20°/60° | ASTM D 4585 ASTM D 523 | 42/70 | 59/82 |
| Salt Spray (168 hrs), Rating System: 10- no effect, 0- total deterioration | ASTM B 117 Visual observation | 8 | 2 |
| Yellowness after 1 month cure in darkness, "b" value**, CIElab system | ASTM E 1347 | 4.7 | 8.4 |
| QUV exposure (100 hr.), 313 nm light source 20°/60° Gloss | ASTM D 4587, Pro. A ASTM D 523 | 41/77 | 6/51 |
| QUV exposure (100 hr.), 313 nm light source YI (Yellowness Index)** | ASTM D 4587, Pro. A ASTM E 313 | 5.9 | 9.4 |

TABLE 14-continued

Coatings Properties of White Paint of Example 16-B

| | Test Method | Example 1 | Resydrol AY 586 |
|---|---|---|---|
| Paint Stability & Dry Film Properties* after Storage | | | |
| Initial (before storage) KU/pH | ASTM D 5626/E 10 | 79/8.3 | 93/8.3 |
| KU/pH after 1 month @ 77° F. (25° C.) | ASTM D5626/E 10 | 80/8.3 | 91/8.1 |
| KU/pH after 1 month @ 120° F. (49° C.) | ASTM D 5626/E 10 | 70/7.8 | 87/7.9 |
| Dry-through, after 1 month @ 120° F. (49° C.) | ASTM D 5895 | 19 hrs | 24 hrs |
| Gloss 20°/60°, after 1 month @ 120° F. (49° C.) | ASTM D 523 | 83/92 | 70/88 |
| "b" value**, CIElab, after 1 month @ 120 F. (49° C.) | ASTM E 1347 | 5.4 | 7.2 |
| Impact, reverse (in.-lb.) after 1 mo. @ 120 F. (49° C.) | ASTM D 2794 | 160 | <10 |

*the coatings were applied to clean, 16 gauge, untreated cold roll steel to give a dry film thickness of 1.2-1.4 mils.
**a larger "b" or YI value indicates a higher level of undesirable yellowing From the results shown in table 14 it can be seen that, in comparison to Resydrol AY 586, example 1 of the present invention displays better initial "b" value; better initial impact reverse value; better resistance to salt spray; better "b" value after one month cure in darkness; better gloss retention after exposure to UV; better resistance to yellowing after exposure to UV; better hydrolytic stability as shown by the maintenance of pH value after 1 month at 77° F. (25° C.); and better dry through time, gloss value, b value and impact reverse value after one month at 120° F. (49° C.).

Example 17

Example 17 is an example where a first alkyd having a high acid value has a hydrophilic macromonomer grafted to it to form grafted copolymer. The grafted copolymer is then reacted with a second alkyd having a lower acid value to form a copolymer alkyd.

Example 17-A

Preparation of a Hydroxy Alkyd Polymer

A four-necked reaction flask equipped with a condenser; agitator; heating mantle; addition funnel; thermocouple attached to a control box (Love control series 32A); and primed Dean-Stark trap with methyl propyl ketone, was charged with 63.9 parts (by weight) of linseed fatty acid, 19.1 parts of pentaerythritol, 16.7 parts of isophthalic acid, 0.3 parts maleic anhydride, and heated under 0.5 SCFH (standard cubic feet per hour) (0.014 m3 hr-1) nitrogen flow to 165° C. At 165° C., water started to distil azeotropically. The reaction temperature was increased to 230° C. and maintained at such temperature until an acid value of 20 was attained. Nitrogen flow was increased to 2 SCFH (0.057 m$^3$hr$^{-1}$) to remove MPK. The alkyd was cooled to 150° C. and filtered.

The resulting resin had 100% non-volatile material (NVM); density 8.51 lb/gallon, Gardener-Holdt viscosity of G-H at 80% NVM in methyl propyl ketone, an acid value of 19.0; a hydroxyl value of 30; a number average molecular weight (Mn) of 1800; a weight average molecular weight (Mw) of 5700; and a polydispersity of 3.1.

Example 17-B

Preparation of an Acid Alkyd

A similar reaction set up to that described in Example 17-A was charged with 29.5 parts (by weight) of linseed fatty acid, 12.2 parts of pentaerythritol, 10.9 parts of isophthalic acid, 0.2 parts maleic anhydride, and heated under 0.5 SCFH (standard cubic feet per hour) (0.014 m3hr-1) nitrogen flow to 165° C. At 165° C., water started to distil azeotropically. The reaction temperature was increased to 230° C. and maintained at such temperature to achieve clarity around an acid value of 25. The reaction temperature was cool down to 140° C., and 47.2 parts of linseed fatty acid was added. Heating was continued between 140° C. and 190° C. to achieve the desired acid value of 70-100. Nitrogen flow was increased to 2 SCFH (0.057 m3 hr-1) to remove MPK. The alkyd was filtered at this temperature.

The resulting resin had 98.2% non-volatile material (NVM); density 8.14 lb/gallon, Gardener-Holdt viscosity of Q, an acid value of 96; a hydroxyl value of −10; a number average molecular weight (Mn) of 800; a weight average molecular weight (Mw) of 3200; and a polydispersity of 4.0.

Example 17-C

Preparation of Acrylic-Acid Alkyd Graft Copolymer and Final Copolymer Alkyd

To a four-neck reaction flask equipped as in Example 17-A, 19.4 parts of acid-alkyd prepared in Example 1-B was added and heated to 140° C. A mixture of 0.5 parts of HL-block type macromonomer prepared as described previously (example 1-B above), 1.2 parts methyl methacrylate, 1.7 parts styrene, 2.8 parts of MPEG-350 (methoxy polyethyleneglycol methacrylate having Mn of 350), 7.3 parts of methacrylic acid, 10.2 parts of isobutyl methacrylate, 1.4 parts of tert-butyl peroxybenzoate and 3.3 parts of xylene was added over 6 hours period. The polymerization was continued for another 1 hr. A mixture of 0.2 parts of tert-butyl peroxy-2-ethylhexanoate and 0.4 parts of xylene was added and hold for additional 1 h. At this stage, the resulting graft copolymer had 92% NVM, an acid value of 151; Mn of 2500; a Mw of 15,000; and a polydispersity of 6.0. To this mixture, 51.6 parts of hydroxyl alkyd of Example 1-A was added and the temperature was increased to 190° C. The reaction was maintained at this temperature until an acid value of 48 was achieved. Nitrogen flow was increased to 2 SCFH (0.057 m3 hr-1) to remove MPK. The alkyd was cooled down to 80° C. and used for dispersion as described in Example 1-D. The resulting final resin had 99.2% non-volatile material (NVM);

Gardener-Holdt viscosity of Q-R at 50% xylene, an acid value of 48; a hydroxyl value of 20; a number average molecular weight (Mn) of 3300; a weight average molecular weight (Mw) of 27000; and a polydispersity of 8.1.

Example 17-D

Preparation of Waterborne Acrylic-Alkyd Dispersion

A four-neck reaction flask equipped with a condenser; agitator; heating mantle; addition funnel; and thermocouple attached to a control box; was charged with 40 parts of the final graft acrylic-alkyd copolymer of Example 1-C. Heating was applied to maintain the temperature around 70°-80° C. Aqueous ammonia (14.5 wt % in water) of 5 parts was added followed by the intimate mixing. De-ionized water (55 parts) was then added gradually over 20-30 minutes with vigorous mixing and agitation while maintaining the temperature between 50-75° C. Additional mixing was maintained for 10 more minutes. The resulting white milky aqueous dispersion had 40.3% NVM; a viscosity of 0.8 Pascal seconds; a particle size of 102 nm; a pH of 7.6 and density of 8.53 lbs/gallon. The emulsion was stable in viscosity, pH and particle size at ambient and elevated temperature (120° F. (48.9° C.)) conditions for five weeks.

The molecular weights given in the present application are calculated by gel permeation chromatography and are given in atomic mass units.

The particle size of the dispersion was determined using a Brookhaven Instrument Model BI-90 plus and was based on the principle of dynamic light scattering. In the present application particle size is reported as the average particle size unless otherwise stated.

It should be noted that the term "comprising" as used in the claims or description of this application does not exclude other elements or steps; and the terms "a" and "an" do not exclude a plurality.

Equivalents and modifications not described above may also be employed without departing from the scope of the invention, which is defined in the accompanying claims.

We claim:

1. A polymeric composition for making aqueous polymeric dispersions, said polymeric composition comprising hydrophilic macromonomer (I), hydrophobic polymer (II) and bridging monomer (III), wherein the hydrophilic macromonomer (I) and hydrophobic polymer (II) are grafted together in the presence of bridging monomer (III); the hydrophilic macromonomer (I) has a structure according to formula (1): $R-C(X)=CH_2$, wherein R is a polymeric group and X is a radical stabilizing group; and the hydrophobic polymer (II) is an alkyd, a polyester, a melamine, a polyurethane, a polyepoxide, a polyisocyanate or a polysiloxane, comprising an ethylenically unsaturated bond, or hybrids or mixtures thereof, and has a number average molecular weight ranging between 500 and 250000.

2. The polymeric composition according to claim 1, wherein the hydrophilic macromonomer (I) has a structure according to formula (2): $R'-C(Z)(Y)-CH_2-C(X)=CH_2$, wherein R' is a polymeric group; at least one of Y or X is a radical stabilizing group and Z is H, C1 to C4 alkyl or a cyano group.

3. The polymeric composition according to claim 1, wherein X is phenyl, and the hydrophilic macromonomer (I) is obtained by addition fragmentation polymerization reaction (AFP) using alpha-methylstyrene dimer (AMSD).

4. The polymeric composition according to claim 1, comprising 1 to 30 wt. % hydrophilic macromonomer (I), 40 to 98 wt. % hydrophobic polymer (II) and 2 to 60 wt. % bridging monomer (III), wherein the total of (I), (II) and (III) is 100%.

5. A polymeric composition according to claim 1, obtained by a process wherein the hydrophobic polymer (II) comprises an ethylenically unsaturated group and the bridging monomer (III) comprises ethylenically unsaturated monomers and wherein the hydrophilic macromonomer (I), hydrophobic polymer (II) and bridging monomer (III) are co-reacted in the presence of a radical initiator.

6. The polymeric composition according to claim 1, wherein the hydrophobic polymer (II) comprises crosslinkable functional groups.

7. The polymeric composition according to claim 1, wherein the hydrophilic macromonomer (I) has a number average molecular weight ranging between 100 and 20000.

8. The polymeric composition according to claim 1, wherein hydrophilic macromonomer (I) is an amphiphilic macromonomer.

9. The polymeric composition according to claim 8, wherein the amphiphilic macromonomer comprises a lipophilic block and a hydrophilic block wherein the lipophilic block is between the hydrophilic block and the unsaturated group.

10. The polymeric composition according to claim 1, wherein the polymeric composition has an acid value less than 40 (mg KOH/gr of the polymeric composition).

11. A process for the manufacture of a polymeric composition comprising the steps, in no particular order, of;
   adding together and reacting
   1) hydrophilic macromonomer (I) having a structure according to formula (1): $R-C(X)=CH_2$, wherein R is a polymeric group and X is a radical stabilizing group;
   2) hydrophobic polymer (II);
   3) bridging monomer (III); and
   4) free radical initiator; wherein the hydrophobic polymer (II) is an alkyd, a polyester, a melamine, a polyurethane, a polyepoxide, a polyisocyanate or a polysiloxane, comprising an ethylenically unsaturated bond, or hybrids or mixtures thereof, and has a number average molecular weight ranging between 500 and 250,000.

12. A process for the manufacture of an aqueous polymer dispersion of claim 11, further comprising the steps of:
   neutralizing the obtained polymeric composition; and
   adding water to the polymeric composition and mixing to obtain an aqueous polymeric dispersion.

13. A process according to claim 11 wherein the bridging monomer (III) comprises ethylenically unsaturated monomers and wherein the hydrophilic macromonomer (I), hydrophobic polymer (II) and bridging monomer (III) are co-reacted in the presence of a radical initiator.

14. A process according to claim 11 wherein the hydrophilic macromonomer (I) has a number average molecular weight ranging between 100 and 20000.

15. A process according to claims 11 wherein hydrophilic macromonomer (I) is an amphiphilic macromonomer.

16. An aqueous polymer dispersion comprising the polymeric composition according to claim 1 dispersed in water and optionally further comprising at least one of: a neutralizing agent, solvent, crosslinking agent and additives.

17. The aqueous polymer dispersion according to claim 16, wherein the hydrophobic polymer (II) is a hydrolysable polymer, comprising a polyester or an alkyd.

18. The polymeric composition according to claim 1 wherein the polymeric composition is used for the production of a coating composition, a printing ink, an adhesive, a sealant, or a caulking material.

19. An aqueous coating composition comprising the aqueous polymer dispersion according to claim 16.

20. A process for the manufacture of a polymeric composition comprising the steps of;
  1) reacting a mixture of
    a) macromonomer (I) having a structure according to formula (1): R—C(X)=CH$_2$, wherein R is a polymeric group and X is a radical stabilizing group,
    b) a precursor polymer, and
    c) bridging monomers (III);
  and subsequently
  2) modifying the precursor polymer to form a hydrophobic polymer (II); wherein the hydrophobic polymer (II) is an alkyd, a polyester, a melamine. a polyurethane, a polyepoxide, a polyisocyanate, or a polysiloxane, comprising an ethylenically unsaturated bond, or hybrids or mixtures thereof, and has a number average molecular weight ranging between 500 and 250,000.

21. The process according to claim 20 wherein the precursor polymer is a polymer, comprising carboxylic acid groups; and step 2 comprises reacting the product of step 1 with another polymer, comprising hydroxyl groups.

22. The polymeric composition according to claim 2, wherein the radical stabilizing group comprises a phenyl, ester, amide, acid or cyano group.

23. The polymeric composition of claim 8, wherein hydrophilic macromonomer (I) is a block macromonomer, comprising a hydrophilic block and a lipophilic block.

24. The polymeric composition of claim 10, wherein the acid value of the polymeric composition is less than 30.

25. The process of claim 15, wherein hydrophilic macromonomer (I) is a block macromonomer, comprising a hydrophilic block and a lipophilic block.

26. The aqueous polymer dispersion according to claim 16, wherein the polymer dispersion is used for the production of a coating composition, a printing ink, an adhesive, a sealant, or a caulking material.

27. The process according to claim 20, wherein the precursor polymer comprises a non-hydrophobic precursor polymer.

28. The process according to claim 21, wherein at least one of the precursor polymer and the other polymer comprise an alkyd polymer.

* * * * *